Figure 1:
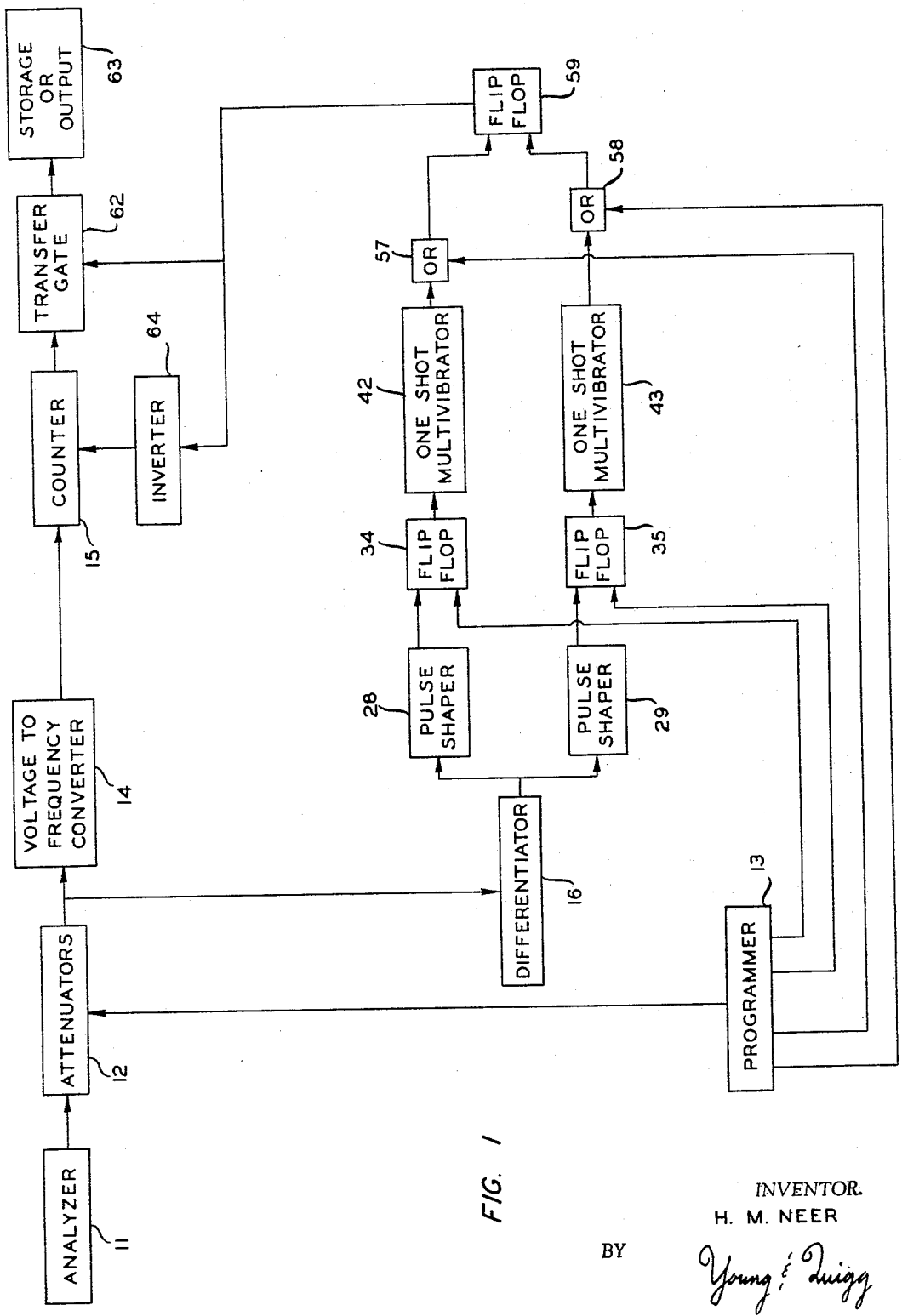

INVENTOR.
H. M. NEER

July 25, 1967  H. M. NEER  3,333,090
ANALYZER USING DIGITAL INTEGRATION TECHNIQUES
Filed Sept. 13, 1963  2 Sheets-Sheet 2

INVENTOR.
H. M. NEER
BY Young & Quigg
ATTORNEYS

United States Patent Office 3,333,090
Patented July 25, 1967

3,333,090
ANALYZER USING DIGITAL INTEGRATION TECHNIQUES
Harold M. Neer, Bartlesville, Okla., assignor to Phillips Petroleum Company, a corporation of Delaware
Filed Sept. 13, 1963, Ser. No. 308,761
8 Claims. (Cl. 235—151.35)

This invention relates to measuring a plurality of signals which are received in sequence. In one aspect the invention relates to method and apparatus for automatically integrating individual signals in a series of such signals. In another aspect the invention relates to improved means and method for starting and stopping the integration of a signal. In a further aspect the invention relates to method and apparatus for integrating selected portions of a signal.

Several types of analytical instruments are known which provide a plurality of output signals in sequence that are representative of the individual components of a material being analyzed. One such analyzer utilizes the principles of chromatography. A sample of a fluid mixture to be analyzed is introduced into a column which contains material that selectively retards passage therethrough of the individual components of the sample. A carrier gas is then directed through the column to elute the individual constituents in sequence. These constituents normally are detected by means of a thermal conductivity cell which measures the heat conductivity of the effluent gas from the column. The detector cell usually comprises a temperature sensitive resistance element which is connected in a bridge network so that an output voltage signal is established. Another type of analyzer which provides a plurality of output signals in sequence is a mass spectrometer. By varing either a magnetic field which deflects the charged particles or a potential which accelerates the charged particles toward the collector, the associated detector responds in sequence to charged particles having different masses. The detector circuit normally provides an output representative of the rate of impingement of charged particles on the collector.

The analog voltage output of such analyzers can be measured directly or integrated by means of an analog integrator. The analog voltage signals can also be converted into corresponding fluctuating signals, the frequencies of which are proportional to the amplitudes of the corresponding voltage signals. The total number of pulses of each individual signal can then be counted to provide an output signal representative of the integral of the corresponding analog voltage input signal.

One difficulty which is encountered in both the analog and the digital integrating systems is the initiating and stopping of the integration at the proper times. This difficulty is particularly great where it is desired to integrate only selected peaks in a series of peaks, where a composite peak representative of two or more components occurs, and where two peaks occur in a very short interval.

Heretofore, it has been the general practice to pass a sample of known compositions through the analyzer and to determine the time of elution of each component or group of components in the case of a composite signal due to the overlap of two or more components. Suitable timing means could then be set to pass the analyzer output signal during those time intervals containing peaks of interest as the time of elution for each particular component would be substantially constant regardless of variations in the concentration of the particular component. Such practice has been generally satisfactory where the timing has not been critical. However, closely spaced peaks sometimes require a high degree of accuracy in the timing. In such instances it has been proposed that a slope sensor be utilized to automatically start integration upon a change in slope from zero to positive and to automatically stop integration upon a change in slope from negtive to zero. However, such apparatus does not have the flexibility desired in many applications. For example such apparatus does not permit the integration of only selected peaks as opposed to each and every peak, or the unitary integration of a compositive peak having two or more peaks.

Accordingly, it is an object of the invention to provide new and improved method and apparatus for measuring a plurality of signals which are received in sequence. Another object of the invention is to provide improved method and apparatus for automatically integrating signals and having a high degree of flexibility without requiring high precision in timing signals utilized to initiate or conclude integration. A further object of the invention is to provide improved method and means for converting an analog signal into a form suitable for use in a digital computer. Another object of the invention is to provide improved recording apparatus and method for use with analytical instruments.

Other objects, aspects, and advantages of the invention will become apparent to those skilled in the art from a study of the disclosure, the drawing, and the appended claims to the invention.

In accordance with the invention, there is provided a system for automatically integrating selected portions of an output signal containing a plurality of sequentially produced voltage signals comprising means for producing a first signal responsive to each absence of a positive slope of the output signal and means for producing a second signal responsive to the negative slope of the output signal. Suitable timing means is employed for producing first and second timing signals. The simultaneous occurrence of one of the first signals and one of the first timing signals is utilized to initiate the integration of said output signal at the termination of the respective first signal. The simultaneous occurrence of one of the second signals and one of the second timing signals is utilized to terminate the integration of the output signal at the termination of the respective second signal.

Figure 2:
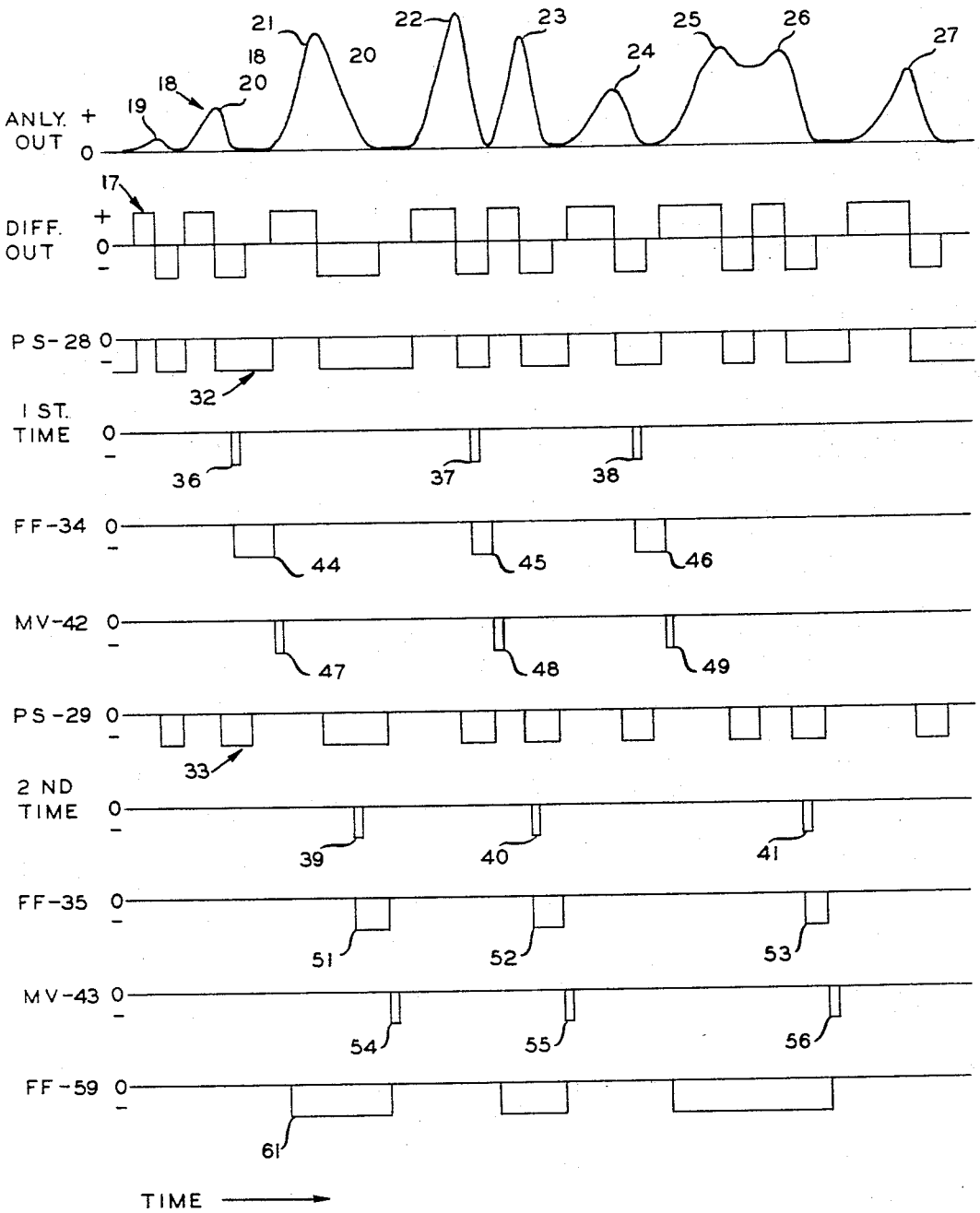

In the drawings FIGURE 1 is a schematic representation of an electrical measuring circuit embodying the invention, and FIGURE 2 is a diagrammatic representation of the output voltages of several of the components of FIGURE 1.

While the invention is applicable to either analog or digital integration, the invention will be described in terms of a digital integration system. Referring now to the drawing and to FIGURE 1 in particular, there is shown a source 11 of a plurality of sequentially produced voltage signals. Source 11 can be an analyzer with each voltage signal being representative of a component of the material being analyzed, for example, a chromatographic analyzer or a mass spectrometer. The output signal from source 11 can be applied to the input of variable attenuating means 12 which is controlled by programmer 13 to provide desired attenuation of individual ones of the voltage signals. Attenuating means 12 can contain an amplifier to increase the output of source 11 to a suitable level for measurement purposes. While programmer 13 and attenuating means 12 can be of any suitable type known, the programmer and attenuating means set forth in copending application Ser. No. 174,543, filed on Feb. 20, 1962, by Marvin C. Burk and Charles E. Jones, now U.S. Patent 3,119,995, is presently preferred. The attenuated voltage signals are applied to an input of voltage-to-frequency converter 14. Converter 14 produces a fluctuating output signal for each input voltage signal applied thereto, each fluctuating output signal comprising a series of pulses having a frequency which is proportional to the amplitude of the respective input voltage. A suitable converter for this purpose is the DY–2210 converter, manufactured by Dymec Inc., Palo Alto, Calif., and which is described in Control Engineering, March 1959, page 144. The output of converter 14 is applied to an input of counter 15 which can be a commercially available binary counter.

The output of attenuating means 12 is also applied to the input of differentiating means 16, which can be any suitable commercially available differentiator. Differentiator 16 preferably has a high gain to produce a substantially square waveform output as illustrated by waveform 17 in FIGURE 2. Waveform 17 represents the output of differentiator 16 corresponding to the output of source 11 illustrated by waveform 18 in FIGURE 2. Waveform 18 comprises peaks or voltage signals 19–27. Thus waveform 17 comprises a positive level for each segment of the output of source 11 which has a positive slope, a negative level for each segment of the output of source 11 which has a negative slope, and zero for each segment of the output of source 11 which has a zero slope, the latter being the intervals between adjacent peaks. The output of differentiator 16 is applied to the inputs of first pulse shaper 28 and second pulse shaper 29, which can be Schmitt trigger circuits. Pulse shaper 28 produces an output voltage only when the output of differentiator 16 is non-positive, that is zero or negative. This can be accomplished by setting pulse shaper 28 to produce an output voltage only when the input voltage is less than a small predetermined positive value, for example, 1 volt. The output of pulse shaper 28 corresponding to input waveform 17 is illustrated by waveform 32 in FIGURE 2. Pulse shaper 29 produces an output voltage only when the input voltage is negative. This can be accomplished by setting pulse shaper 29 to produce an output voltage only when the input voltage is less than a small predetermined negative voltage, for example −1 volt. The output of pulse shaper 29 corresponding to input waveform 17 is illustrated by waveform 33 in FIGURE 2. The output of pulse shaper 28 is applied to an input of a first suitable gating means, such as a flip-flop circuit 34. The output of pulse shaper 29 is applied to an input of a second gating means, such as a flip-flop circuit 35.

Suitable timing means, which is preferably a part of programmer 13, is utilized to produce a first gating signal, or arming pulse, during the interval between the crest of the voltage signal preceding the voltage signal to be integrated and the leading edge of the voltage signal to be integrated, that is, during the negative slope of the preceding peak and the interval of zero slope. The first gating signal is applied from programmer 13 to the set input of flip-flop 28. Programmer 13 also produces a second gating signal, or arming pulse, during the negative slope of the voltage signal being integrated. The second gating signal is applied to the set input of flip-flop 29.

Where it is desired to integrate peaks 21, 23, 25 and 26 with the latter two being taken collectively, the corresponding first gating signals are illustrated as pulses 36, 37 and 38 while the corresponding second gating signals are illustrated as pulses 39, 40 and 41. Upon the simultaneous occurrence of an output voltage being passed from pulse shaper 28 to flip-flop 34 and a first gating signal, flip-flop 34 passes an output voltage to one-shot multivibrator 42, and multivibrator 42 fires on the termination, that is, the trailing edge, of the respective output voltage from flip-flop 34. When the output voltage of pulse shaper 28 goes to zero, flip-flop 34, is automatically reset and will not produce an output voltage until it is again armed by a first gating signal. Upon the simultaneous occurrence of an output voltage being passed from pulse shaper 29 to flip-flop 35 and a second gating signal, flip-flop 35 passes an output voltage to one-shot multivibrator 43, and multivibrator 43 fires on the termination of the respective output voltage from flip-flop 35. When the output voltage of pulse shaper 35 goes to zero, flip-flop 35 is automatically reset and will not produce an output voltage until it is again armed with a second gating signal. For waveform 32 and first gating pulses 36, 37 and 38, the output of flip-flop 34 is illustrated by pulses 44, 45 and 46 while the corresponding output of multivibrator 42 is represented by pulses 47, 48 and 49. For waveform 33 and second gating pulses 39, 40 and 41, the output of flip-flop 35 is represented by pulses 51, 52 and 53 while the corresponding output of multivibrator 43 is represented by pulses 54, 55 and 56. The outputs of multivibrators 42 and 43 are passed through "or" circuits 57 and 58 to first and second inputs, respectively, of third flip-flop circuit 59. Where it is desired to utilize a timing signal from programmer 13 instead of the "counter reset" signal from multivibrator 42 or the "count transfer" signal from multivibrator 43, such signal can be applied to a second input of "or" circuit 57 or 58, respectively.

The output of flip-flop circuit 59 corresponding to pulses 47, 48, 49, 51, 52 and 53 is represented by waveform 61 and is applied to a control input of transfer gate 62. Transfer gate 62 is connected between the output of counter 15 and the input of storage or output means 63 and is adapted to transmit the output of counter 15 to storage or output means 63 on the occurrence of the termination or trailing edge of each pulse in waveform 61. The output of flip-flop circuit 59 is also applied through inverter 64 to the reset input of counter 15 to reset counter 15 on the occurrence of the termination or trailing edge of each pulse in the inverted version of waveform 61.

The output signals of converter 14 are thus sequentially applied to the signal input of counter 15 so that a count is registered thereon representative of the number of pulses in the respective output signal. If the particular output signal being counted corresponds to a peak or voltage signal for which an integrated value is desired, transfer gate 62 is actuated by flip-flop circuit 59 at the conclusion of the voltage signal and the desired count is transferred to storage or output means 63. At the beginning of the next voltage signal for which an integrated value is desired, counter 15 is reset by flip-flop 59 to remove any previous count registered thereon and counting begins anew.

Storage or output means 63 can be any suitable means for receiving the output of counter 15, for example, recording means, delay means, general purpose digital computer, or special purpose digital computer, an embodiment of the latter being disclosed in copending application Serial No. 174,489 filed Feb. 20, 1962, by Marvin C. Burk, Harold M. Neer, and Charles E. Jones, now U.S. Patent 3,267,264. It is within the contemplation of the invention to utilize two or more counters instead of a single counter 15 to permit the counting of one peak while another counter is being read. A suitable system utilizing two alternate counters is disclosed in copending application Ser. No. 187,277, filed Apr. 15, 1962, by Marvin C. Burk and Harold M. Neer, now U.S. Patent 3,280,313, in which the output of flip-flop 59 in the instant invention can be applied by way of line 35 as the signal from programmer 25 to flip-flop 36 in said copending application. A separate counter can be utilized to register a value representative of the total number of pulses in the output signals from converter 14 corresponding to a complete analysis or cycle.

While the invention has been described in terms of a digital integration system, it is also applicable to an analog integration system. In an analog integration system converter 14 and counter 15 would be replaced with an analog integrator. While the input to differentiator 16 has been illustrated as being taken from the output of attenuating means 12, it is within the contemplation of the invention for the input to be taken from the output of either source 11 or converter 14. In the latter instance a frequency-to-voltage converter could be utilized to provide an analog voltage input to differentiator 16.

Reasonable variation and modification are possible within the scope of the foregoing disclosure, the drawing and the appended claims to the invention.

I claim:

1. Apparatus comprising a chromatographic analyzer adapted to provide a plurality of output voltages in sequence, each representative of a component of the material being analyzed; means for variably attenuating each of the output voltages of said analyzer; means to apply the output voltages from said analyzer to the input of said means for attenuating; means for converting each of the thus attenuated output voltages of said analyzer into a fluctuating output signal, each fluctuating output signal comprising a series of pulses having a frequency which is proportional to the amplitude of the respective attenuated output voltage; means for applying said attenuated output voltages from said means for attenuating to said means for converting; counting means; means for applying in sequence the fluctuating output signals from said means for converting to an input of said counting means; transfer gating means; means for applying the output of said counting means to an input of said transfer gating means; means for receiving the output of said counting means; means for applying the output of said transfer gating means to an input of said means for receiving; differentiating means; means to applying said attenuated output voltages to an input of said differentiating means; first pulse shaping means for producing an output voltage only when the input thereto is less than a small positive value; second pulse shaping means for producing an output voltage only when the input thereto is less than a small negative voltage; means for applying the output of said differentiating means to an input of said first pulse shaping means and to an input of said second pulse shaping means; a first flip-flop circuit; a second flip-flop circuit; means for connecting the output of said first pulse shaping means to a first input of said first flip-flop circuit; means for connecting the output of said second pulse shaping means to a first input of said second flip-flop circuit; timing means for producing first arming pulses and second arming pulses; means for applying said first arming pulses to a second input of said first flip-flop circuit; means for applying said second arming pulses to a second input of said second flip-flop circuit; a first one-shot multivibrator; a second one-shot multivibrator; means for connecting the output of said first flip-flop circuit to an input of said first multivibrator to fire said first multivibrator at the trailing edge of an output signal from said first pulse shaping means upon the occurrence of a first arming pulse during the respective output signal from said first pulse shaping means; means for connecting the output of said second flip-flop circuit to an input of said second multivibrator to fire said second multivibrator at the trailing edge of an output signal from said second pulse shaping means upon the occurrence of a second arming pulse during the respective output signal from said second pulse shaping means; a third flip-flop circuit; means for applying the output of said first multivibrator to a first input of said third flip-flop circuit; means for applying the output of said second multivibrator to a second input of said third flip-flop circuit; means connected to an output of said third flip-flop circuit for actuating said transfer gating means to transmit the output of said counting means to said means for receiving responsive to the occurrence of an output signal from said second multivibrator; and means connected to an output of said third flip-flop circuit for resetting said counting means responsive to the occurrence of an output signal from said first multivibrator.

2. Apparatus comprising an analyzer adapted to provide a plurality of output voltages in sequence, each representative of a component of the material being analyzed; means for converting each of the output voltages from said analyzer into a fluctuating output signal, each fluctuating output signal comprising a series of pulses having a frequency which is proportional to the amplitude of the respective output voltage; means for applying the output voltages from said analyzer to an input of said means for converting; counting means; means for applying in sequence the fluctuating output signals from said means for converting to an input of said counting means; transfer gating means; means for applying the output of said counting means to an input of said transfer gating means; means for receiving the output of said counting means; means for applying the output of said transfer gating means to an input of said means for receiving; differentiating means; means to apply signals representative of the output voltages of said analyzer to an input of said differentiating means; first pulse shaping means for producing an output voltage only when the input thereto is less than a small positive voltage, second pulse shaping means for producing an output voltage only when the input thereto is less than a small negative voltage; means for applying the output of said differentiating means to an input of said first pulse shaping means and to an input of said second pulse shaping means; a first flip-flop circuit; a second flip-flop circuit; means for connecting the output of said first pulse shaping means to a first input of said first flip-flop circuit; means for connecting the output of said second pulse shaping means to a first input of said second flip-flop circuit; timing means for producing first arming pulses and second arming pulses; means for applying said first arming pulses to a second input of said first flip-flop circuit; means for applying said second arming pulses to a second input of said second flip-flop circuit; a first one-shot multivibrator; a second one-shot multivibrator; means for connecting the output of said first flip-flop circuit to an input of said first multivibrator to fire said first multivibrator at the trailing edge of an output signal from said first pulse shaping means upon the occurrence of a first arming pulse during the respective output signal from said first pulse shaping means; means for connecting the output of said second flip-flop circuit to an input of said second multivibrator to fire said second multivibrator at the trailing edge of an output signal from said second pulse shaping means upon the occurrence of a second arming pulse during the respective output signal from said second pulse shaping means; means responsive to the output of said second multivibrator for actuating said transfer gating means; and means responsive to the output of said first multivibrator for resetting said counting means.

3. Apparatus comprising a signal source adapted to provide a plurality of output voltages in sequence; means for converting each of said output voltages into a fluctuating output signal, each fluctuating output signal comprising a series of pulses having a frequency which is proportional to the amplitude of the respective output voltage; means for applying said output voltages from said signal source to an input of said means for converting; counting means; means for applying in sequence the fluctuating output signals from said means for converting to an input of said counting means; transfer gating means; means for applying the output of said counting means to an input of said transfer gating means; means for receiving the output of said counting means; means for applying the output of said transfer gating means to an input of said means for receiving; differentiating means; means to apply signals representative of said output voltages of said signal source to an input of said differentiating means; first means for producing an output voltage only when the input voltage therethrough is less than a small positive voltage; second means for producing an output voltage only when the input therethrough is less than a small negative voltage; means for applying the output of said differentiating means to an input of said first means for producing and to an input of said second means for producing; timing means for producing first arming pulses and second arming pulses; means responsive to the simultaneous occurrence of a second arming pulse from said timing means and an output signal from said second means for producing to actuate said transfer gating means to transmit the output of said counting means to said means for receiving at the termination of the respective output signal from said second means for producing; and means responsive to the simultaneous occurrence of a first arming pulse from said timing means and an output signal from said first means for producing for resetting said counting means at the termination of the respective output signal from said first means for producing.

4. Apparatus comprising a signal source adapted to provide a plurality of output voltages in sequence; integrating means; means for applying said output voltages from said signal source to an input of said integrating means in sequence; transfer gating means; means for applying the output of said integrating means to an input of said transfer gating means; means for receiving the output of said integrating means; means for applying the output of said transfer gating means to an input of said means for receiving; differentiating means; means to apply said output voltages from said signal source to an input of said differentiating means; first pulse shaping means for producing an output voltage only when the input thereto is less than a small positive voltage; second pulse shaping means for producing an output voltage only when the input thereto is less than a small negative voltage; means for applying the output of said differentiating means to an input of said first pulse shaping means and to an input of said second pulse shaping means; a first flip-flop circuit; a second flip-flop circuit; means for connecting the output of said first pulse shaping means to a first input of said first flip-flop circuit; means for connecting the output of said second pulse shaping means to a first input of said second flip-flop circuit; timing means for producing first arming pulses and second arming pulses; means for applying said first arming pulses to a second input of said first flip-flop circuit; means for applying said second arming pulses to a second input of said second flip-flop circuit; a first one-shot multivibrator; a second one-shot multivibrator; means for connecting the output of said first flip-flop circuit to an input of said first multivibrator to fire said first multivibrator at the trailing edge of an output signal from said first pulse shaping means upon the occurrence of a first arming pulse during the respective output signal from said first pulse shaping means; means for connecting the output of said second flip-flop circuit to an input of said second multivibrator to fire said second multivibrator at the trailing edge of an output signal from said second pulse shaping means upon the occurrence of a second arming pulse during the respective output signal from said second pulse shaping means, means responsive to the occurrence of an output signal from said second multivibrator to actuate said transfer gating means to transmit the output of said integrating means to said means for receiving; and means responsive to the occurrence of an output signal from said first multivibrator to actuate said integrating means.

5. Apparatus comprising a signal source adapted to provide a plurality of output voltages in sequence; integrating means; means for applying said output voltages from said signal source to an input of said integrating means in sequence; transfer gating means; means for applying the output of said integrating means to an input of said transfer gating means; means for receiving the output of said integrating means; means for applying the output of said transfer gating means to an input of said means for receiving; differentiating means; means to apply said output voltages from said signal source to an input of said differentiating means; means responsive to the output of said differentiating means for producing a first output signal only when the output of said differentiating means is non-positive, means responsive to the output of said differentiating means for producing a second output signal only when the output of said differentiating means is negative; timing means for producing first and second timing signals; means responsive to the simultaneous occurrence of a first output signal and a first timing signal to actuate said integrating means at the termination of the respective first output signal; and means responsive to the simultaneous occurrence of a second output signal and a second timing signal to actuate said transfer gating means to transmit the output of said integrating means to said means for receiving at the termination of the respective second output signal.

6. Apparatus comprising a signal source adapted to provide a plurality of output voltages in sequence; integrating means; means for applying said output voltages from said signal source to an input of said integrating means in sequence; transfer gating means; means for applying the output of said integrating means to an input of said transfer gating means; means for receiving the output of said integrating means; means for applying the output of said transfer gating means to an input of said means for receiving; differentiating means; means to apply said output voltages from said signal source to an input of said differentiating means; pulse shaping means for producing an output voltage only when the input thereto is less than a small positive voltage; means for applying the output of said differentiating means to an input of said pulse shaping means; timing means for producing first and second timing signals; means responsive to the simultaneous occurrence of an output signal from said pulse shaping means and a first timing signal to actuate said integrating means at the termination of the respective output signal from said pulse shaping means; and means responsive to each of said second timing signals to actuate said transfer gating means to transmit the output of integrating means to said means for receiving.

7. Apparatus comprising a signal source adapted to provide a plurality of output voltages in sequence; integrating means; means for applying said output voltages from said signal source to an input of said integrating means in sequence; transfer gating means; means for applying the output of said integrating means to an input of said transfer gating means; means for receiving the output of said integrating means; means for applying the output of said transfer gating means to an input of said means for receiving; differentiating means; means to apply said output voltages from said signal source to an input of said differentiating means; pulse shaping means responsive to the output of said differentiating means for producing an output signal only when the output of said differentiating means is negative; timing means for producing first and second timing signals; means responsive to the simultaneous occurrence of a second timing signal and an output signal from said pulse shaping means to actuate said transfer gating means to transmit the output of said integrating means to said means for receiving at the termination of the respective output signal from said pulse shaping means; and means responsive to a first timing signal for actuating said integrating means.

8. Apparatus comprising a signal source adapted to provide a plurality of output voltages in sequence; means for converting each of said output voltages into a fluctuating output signal, each fluctuating output signal comprising a series of pulses having a frequency which is proportional to the amplitude of the respective output voltage; means for applying said output voltages from said signal source to an input for said means of converting counting means; means for applying in sequence the fluctuating output signals from said means for converting to an input of said counting means; transfer gating means; means for applying the output of said counting means to an input of said transfer gating means; means for receiving the output of said counting means; means for applying the output of said transfer gating means to an input of said means for receiving; differentiating means; means to apply signals representative of said output voltages of said signal source to an input of said differentiating means; means for producing an output voltage only when the input voltage thereto is non-positive; means for applying the output of said differentiating means to an input of said means for producing; timing means for producing first and second timing signals; means responsive to the simultaneous occurrence of a first timing signal and an output signal from said means for producing for resetting said counting means at the termination of the respective output signal from said means for producing; and means responsive to each of said second timing signals for actuating said transfer gating means to transmit the output of said counting means to said means for receiving.

References Cited

UNITED STATES PATENTS

| | | | |
|---|---|---|---|
| 3,121,160 | 2/1964 | Burk | 235—151.35 |
| 3,185,820 | 5/1965 | Williams et al. | |
| 3,230,358 | 1/1966 | Davis et al. | 235—183 |

MALCOLM A. MORRISON, *Primary Examiner.*

I. KESCHNER, M. P. HARTMAN, *Assistant Examiners.*